Figures 1, 2:
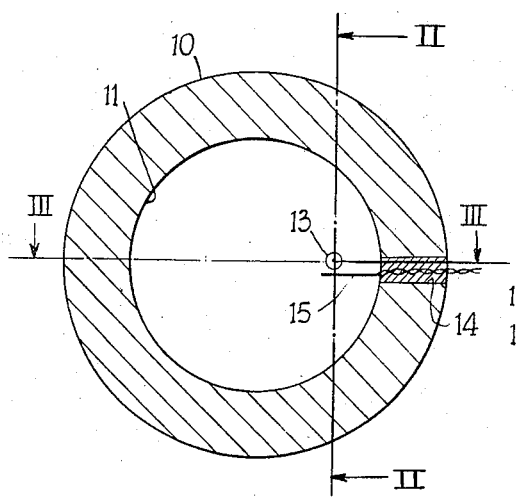

June 16, 1959     A. J. P. MARTIN     2,890,586

APPARATUS FOR DETECTING MOVEMENTS OF A FLUID

Filed Aug. 16, 1954

INVENTOR:
ARCHER JOHN PORTER MARTIN

By Stevens, Davis, Miller & Mosher
Attorneys

United States Patent Office 2,890,586
Patented June 16, 1959

2,890,586

APPARATUS FOR DETECTING MOVEMENTS OF A FLUID

Archer John Porter Martin, Boreham Wood, England, assignor, by mesne assignments, to Consolidated Electrodynamics Corporation, Pasadena, Calif., a corporation of California Application August 16, 1954, Serial No. 449,845

Claims priority, application Great Britain September 8, 1953

2 Claims. (Cl. 73—204)

The present invention relates to an improved apparatus of measuring the rate of flow of a fluid.

The invention is particularly, although not exclusively, suitable for detecting very slow movements, for example, those due to thermal expansion of a fluid or flows through a pipe of the order of centimeters per second and less.

A well known form of fluid-flow meter consists of a fine wire placed in the fluid under test and connected electrically with a source of current and arranged as one arm of a Wheatstone bridge. The laws relating to the rate of cooling of a hot wire in moving fluid are now fairly well established and with the aid of such apparatus the rate of flow of a fluid may be ascertained from observations upon the wire itself. For example, the velocity may be deduced from changes in the resistance in the wire (with change of velocity) or from changes of current passed through the wire in order to maintain its temperature constant.

The present invention differs from these known methods in that observations need not be taken upon the wire itself. Instead, a hot wire or some other local source of heat is used to produce a steady gradient of temperature in a fluid, which may be the fluid under test, and then the flow is used to alter the gradient, resulting changes of temperature at a selected point in the gradient being measured, and from these measurements the movement of the test fluid being ascertained.

Conveniently the body of fluid in which the gradient of temperature is produced, may be held in a container such as a copper block which is held at constant temperature.

The gradient of temperature may be produced by a hot body such as a coil of resistance wire passed through a seal into the container and heated electrically so as to produce in the container an ascending convection current of relatively warm fluid.

Alternatively, the gradient of temperature may be produced mainly by conduction. In the case where the fluid being measured is at low pressure, conduction plays a relatively large part in the process. In such a case the change of flow may be used as a measurement of the low pressure.

The temperature measuring device may be a thermocouple, one junction of which is located in the current and the other of which is held, externally of the container, at constant temperature.

If the gradient of temperature set up includes a maximum, then both junctions may be located in the gradient, one on either side of the maximum, so that they are at two positions of substantially equal temperatures, in which case as long as the gradient remains steady no electric potential is developed in the thermo-couple. If, however, the point of maximum temperature moves to one side or the other, one junction has its temperature raised and the other lowered and an electric potential is generated in the thermo-couple.

Where the local source of heat is used to produce an ascending convection current, the fluid under test is directed against the convection current in such a way that if a change occurs in the rate of flow of the fluid under test, the convection current is blown to one side, so that the temperature conditions at the temperature-measuring device are altered and, with the aid of suitable calibration, a record is provided of the rate of flow of the fluid under test.

Figures 3, 4:
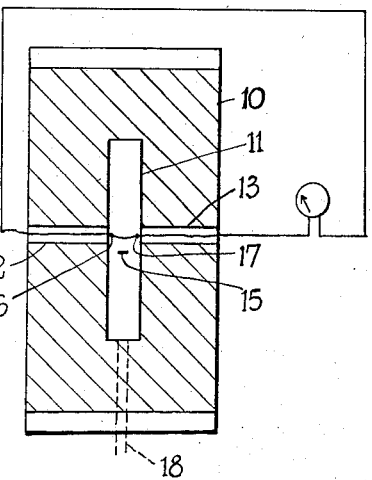
Figure 5:
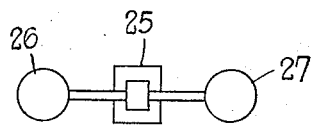

Examples of apparatus with which the invention may be carried out are illustrated diagrammatically in the accompanying drawings, in which:

Figure 1 is a sectional side elevation of the device,
Figure 2 is a section on the line II—II of Figure 1,
Figure 3 is a section on the line III—III of Figure 1,
Figure 4 is a flow diagram showing how the flow of gas through a pipe may be measured, and
Figure 5 illustrates how low pressures may be measured.

The device illustrated in Figures 1 to 3 comprises a container 10 in the form of a short cylinder having its axis horizontal and in which is formed a hollow space 11 of disc shape. Into the hollow space enter two passages 12 and 13 and, sealed through the container at 14 is a hair pin resistance wire 15 which may be heated electrically. Through the coaxial passages 12 and 13 is passed a thermo-couple the junctions of which are shown at 16 and 17.

Whilst the wire 15 is heated, a current of relatively warm gas ascends from the heated wire 15 over the thermo-couple and by moving the junctions 16 and 17 to the right or left, or by moving the heater with reference to the couple, or by tilting the container, a position can be found where the two junctions are at substantially the same temperature. Under these conditions the thermocouples are symmetrically oriented in opposite boundary layers of the current or plume of warm fluid ascending from the heater. If, however, for any reason a gas or vapour under test flows through the container, in either direction, between the passages 12 and 13, the relatively warm current of gas ascending from the wire is as it were blown over to one side or the other so that one junction of the thermo-couple is heated and the other cooled. From observation of the changes of temperature, and by suitable calibration, the rate of flow of the fluid can be ascertained.

If for any reason it be desired to prevent the fluid under test from entering the container 10, for example if the fluid is an explosive gas, an inert gas may be supplied to the container through an inlet 18, at constant pressure, so that it escapes through both outlets 12 and 13. The flowing fluid to be measured is applied to the two outlets so as to cause a pressure difference sufficient to shift the gradient of temperature set up in the container. But the pressure at which the inert gas is supplied is sufficient to prevent any of the explosive gas from entering the container.

The arrangement illustrated in Figure 4 may be used to measure a slow rate of flow of a gas through a conduit.

A portion of the gas flowing through a main 19 is by-passed through a pipe 20, a container 21 similar to that illustrated in Figures 1 to 3, a pipe 22 and back to the main 19, the device being used as described with reference to Figures 1 to 3.

If it be desired to measure only a change in the rate of flow, cocks 23 and 24 are first opened, then a datum gradient of temperature is set up in the container 21 from which all changes are measured to give the change in the rate of flow.

In laboratory work especially it is often necessary to be able to measure the loss of vacuum along an apparatus at one point in which an approximately constant low pressure is maintained. Figure 5 illustrates how the present invention may be used for this purpose.

The constant low pressure is first applied to both sides of a device 25 similar to that of Figures 1 to 3, whilst a datum gradient of temperature is set up in the device. Thereafter the known constant low pressure is applied to one side of the device as at 26 in Figure 5 and the pressure to be measured is applied to the other side as at 27, differences of pressure being derived from the observed changes of temperature.

The lower the pressures at which the flow is measured, the bigger is the part played by conduction in setting up the steady gradient of temperature, and the less is the part played by convection. Thus at low pressures the local source of heat need not be placed below the temperature measuring device.

Where, however, the gradient is produced mainly by convection, a fine adjustment of the apparatus, for example in order to get equal temperatures at the thermocouple junctions when they are one on either side of a point of maximum temperature, may be achieved by tilting the container 10 (Figures 1 to 3), in positive or negative angular sense with respect to Figure 2.

The flow of fluid through the container in a horizontal direction may consist of a very slight movement only, and may be produced in a variety of ways, for example by producing a change in the density-difference, temperature-difference or pressure-difference of the test gas across the two passages, or by varying two or three of these factors in combination, in which case the measured movement or flow may be used to measure the property difference.

What I claim is:

1. Apparatus for measuring the rate of flow of a fluid comprising a container defining a chamber, inlet and outlet means through opposite walls of the container opening into the chamber and of smaller diameter than the chamber, a source of heat disposed in the chamber below and substantially midway between the inlet and outlet means to produce a plume of hot fluid symmetrically disposed under static conditions between the inlet and outlet means and in the path of fluid flow between the inlet and outlet means, a first thermocouple junction disposed in the chamber adjacent the inlet and in the boundary layer of said plume of hot fluid, a second thermocouple junction disposed in the chamber adjacent the outlet and in the opposite boundary layer of said plume of hot fluid whereby the two thermocouples are at substantially the same temperature with no fluid flow between inlet and outlet, and means exteriorly of the container to measure the difference in electrical output of the thermocouple junctions consequent upon any lateral displacement of said plume of hot fluid.

2. Apparatus for measuring the rate of flow of a fluid comprising a container defining a cylindrical chamber, inlet and outlet means opening directly opposite each other into the chamber through opposite walls along an axis displaced from the axis of revolution of the cylindrical chamber, the inlet and outlet openings being of smaller diameter than the chamber, a source of heat disposed in the chamber below and substantially midway between the inlet and outlet means to produce a plume of hot fluid symmetrically disposed under static conditions between the inlet and outlet means and in the path of fluid flow between the inlet and outlet means, a first thermocouple junction disposed in the chamber adjacent the inlet and in the boundary layer of the plume of hot fluid, a second thermocouple junction disposed in the chamber adjacent the outlet and in the opposite boundary of the plume of hot fluid, and means exteriorly of the container to measure the difference in electrical output of the thermocouple junctions consequent upon any lateral displacement of said plume of hot fluid.

References Cited in the file of this patent

UNITED STATES PATENTS

| | | |
|---|---|---|
| 1,766,149 | Sawyer | June 24, 1930 |
| 2,440,189 | Zworykin | Apr. 20, 1948 |
| 2,460,873 | Clewell et al. | Feb. 8, 1949 |
| 2,509,889 | Shockley | May 30, 1950 |
| 2,586,060 | Kronberger | Feb. 19, 1952 |
| 2,647,401 | Hathaway | Aug. 4, 1953 |
| 2,733,605 | Buck | Feb. 7, 1956 |
| 2,786,354 | Martin et al. | Mar. 26, 1957 |
| 2,813,237 | Fluegel et al. | Nov. 12, 1957 |

FOREIGN PATENTS

| | | |
|---|---|---|
| 765,169 | France | Mar. 19, 1934 |
| 743,788 | Germany | Jan. 3, 1944 |
| 591,690 | Great Britain | Aug. 26, 1947 |
| 704,162 | Great Britain | Feb. 17, 1954 |